United States Patent [19]

Hiramatsu

[11] Patent Number: 4,775,938

[45] Date of Patent: Oct. 4, 1988

[54] SYSTEM AND METHOD FOR CONTROLLING A POWER TRANSMISSION OF A VEHICLE

[75] Inventor: Takeo Hiramatsu, Nagaokakyo, Japan

[73] Assignee: Mitsubishi Jidosha Kogyo Kabushiki Kaisha, Tokyo, Japan

[21] Appl. No.: 791,898

[22] Filed: Oct. 28, 1985

[30] Foreign Application Priority Data

Oct. 31, 1984 [JP] Japan ................... 59-227950
Oct. 31, 1984 [JP] Japan ................... 59-229490

[51] Int. Cl.⁴ ...................... B60K 41/08; F16H 47/00
[52] U.S. Cl. ................... 364/424.1; 74/866; 74/867
[58] Field of Search ............... 364/424.1; 74/865, 866, 74/867, 869

[56] References Cited

U.S. PATENT DOCUMENTS

| | | | |
|---|---|---|---|
| 4,513,639 | 4/1985 | Hiramatsu | 74/866 |
| 4,538,482 | 9/1985 | Hiramatsu | 74/869 |
| 4,603,604 | 8/1986 | Nishikawa et al. | 74/869 |
| 4,633,985 | 1/1987 | Leorat | 74/866 |
| 4,653,622 | 3/1987 | Miyake | 74/866 |
| 4,660,442 | 4/1987 | Nishikawa et al. | 74/869 |

Primary Examiner—Felix D. Gruber
Attorney, Agent, or Firm—Abelman Frayne Rezac & Schwab

[57] ABSTRACT

The torque capacity of a torque transmitting device incorporated in a power transmission system between an output shaft of a hydrodynamic power transmission and a drive shaft of a vehicle is so controlled as to provide a predetermined rotation speed difference between the input and output shafts of the hydrodynamic power transmission when the vehicle is in a state of standstill, thereby reducing creeping of the vehicle in the standstill state and also improving the response of the power transmission system at the time of vehicle starting. When the vehicle is to be started, the torque capacity is feedback-controlled so as to change the rotation speed of the output shaft of the hydrodynamic power transmission at a predetermined changing rate, thereby ensuring smooth starting without any appreciable shock.

24 Claims, 5 Drawing Sheets

SYSTEM AND METHOD FOR CONTROLLING A POWER TRANSMISSION OF A VEHICLE

FIELD OF THE INVENTION

This invention relates to a power transmission including a hydrodynamic power transmission, and more particularly to improvements in an automatic transmission for a vehicle.

BACKGROUND OF THE INVENTION

A vehicle equipped with an automatic transmission of the type including a hydrodynamic power transmission, such as a torque converter or a fluid coupling, frequently encounters a problem called "creeping phenomenon" which permits gradual movement of the vehicle from its standstill state. To obviate this problem, an automatic transmission has been proposed which is automatically placed in its neutral mode when the vehicle is in a state of standstill and the accelerator pedal has not been depressed. As soon as depression of the accelerator pedal is detected, frictional engaging devices such as brakes and clutches are selectively engaged to attain power transmission.

Vibration of the engine and fuel consumption of the engine in a standstill state of the vehicle can be reduced by employment of the automatic transmission of the above construction. However, there occurs a substantial shock at the time of vehicle starting due to abrupt engagement of the frictional engaging devices.

This problem can be obviated by gradually engaging the frictional engaging devices at the time of vehicle starting. However, such gradual engagement of the frictional engaging devices leads to further problems in that establishment of the power transmission system at the time of vehicle starting time is delayed, this resulting in degradation of the starting acceleration characteristic. Also, a rise in the engine rotation speed can impart excessive load to the frictional engaging devices and result in burnout of the frictional engaging devices.

SUMMARY OF THE INVENTION

It is a primary object of the present invention to provide a control system for a power transmission of a vehicle, which can reduce the undesirable tendency of the vehicle to creep from a standstill state of the vehicle.

According to the present invention, a control system is provided for controlling a torque transmitting device interposed between an output shaft of a hydrodynamic power transmission and a drive shaft of a vehicle. The torque capacity of the torque transmittig device is so controlled as to provide a predetermined difference between the rotation speeds of the input and output shafts of the hydrodynamic power transmission when the vehicle is in a state of standstill. The torque transmitting device is placed in a partially engaged state by the control so that the undesirable creeping can be reduced, and the response of the power transmission system at the time of vehicle starting can be improved.

Also, according to the present invention, the predetermined rotation speed difference between the input and output shafts of the hydrodynamic power transmission is changed in dependence on the rotation speed of the input shaft of the hydrodynamic power transmission (the output shaft of the engine), so as to prevent burnout of the torque transmitting device, and, also to prevent an undesirable increase in the tendency of the vehicle to creep, due to an increase in the amount of transmitted torque resulting from an increase in the rotation speed of the engine, such as when the engine is in its cold state in a standstill state of the vehicle.

Further, according to the present invention, the torque capacity of the torque transmitting device is feedback-controlled when the vehicle is to be started, so that the changing rate of the rotation speed of the output shaft of the hydrodynamic power transmission is maintained at a determined rate, thereby alleviating the shock occurring at the time of vehicle starting and ensuring smooth vehicle starting.

BRIEF DESCRITION OF THE DRAWINGS

Figure 3:
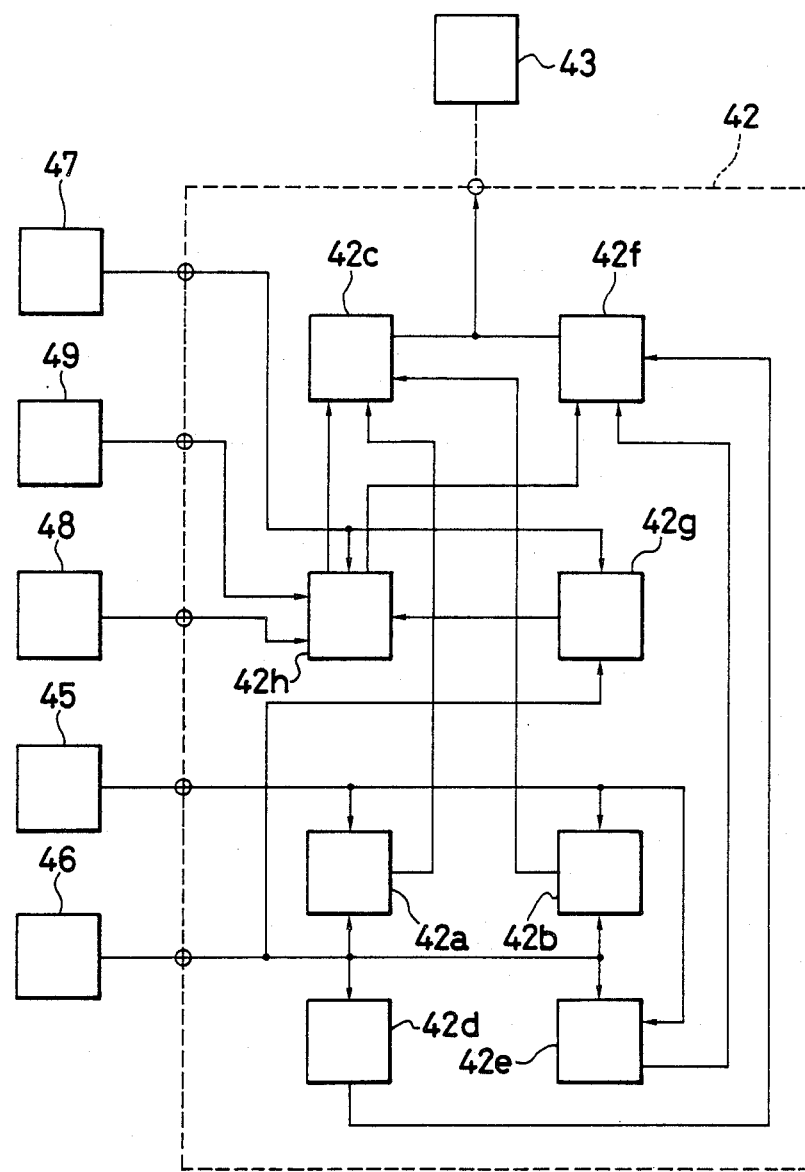
FIG. 3 is a flow chart showing the steps of control processing in a preferred embodiment of the present invention applied to the automatic transmission.
Figure 4:
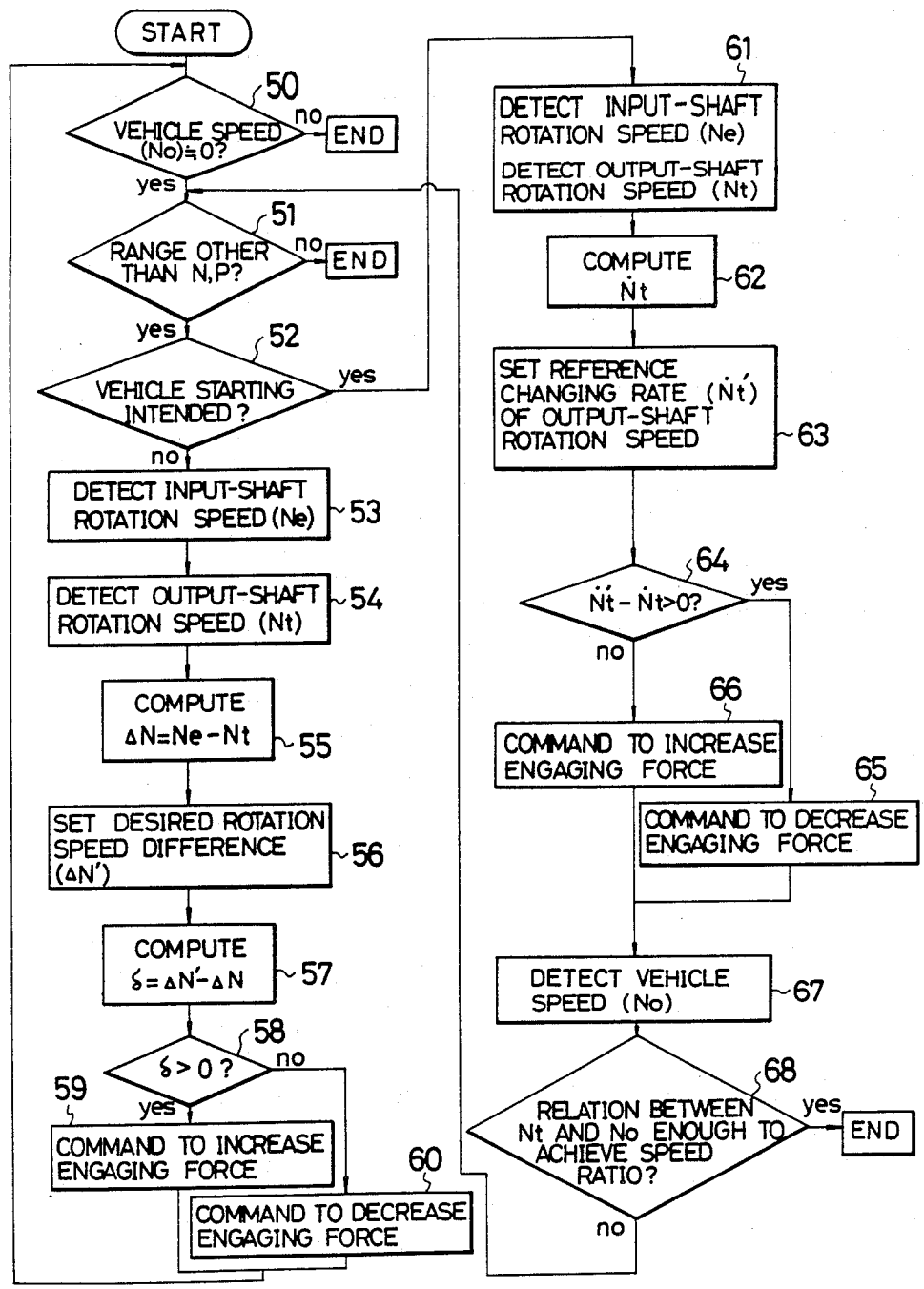

FIGS. 4(a) and 4(b) are graphs illustrating the manner of control according to the flow chart shown in FIG. 3.

DESCRIPTION OF THE PRIOR ART EMBODIMENT

Before describing the present invention in detail, an example of an automatic transmission to which the present invention is applied will be briefly described with reference to FIG. 1 which shows schematically the structure of such an automatic transmission.

Figure 1:
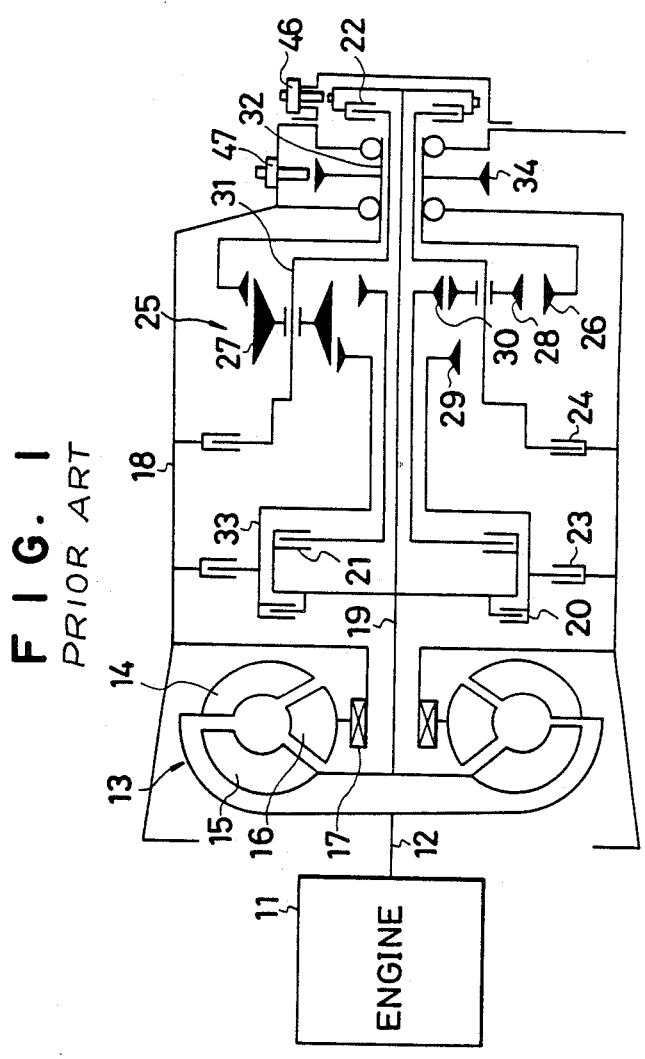
FIG. 1 is a skelton diagram showing schematically the structure of a prior art automatic power transmission for a vehicle to which the present invention is applied.
Figure 2:
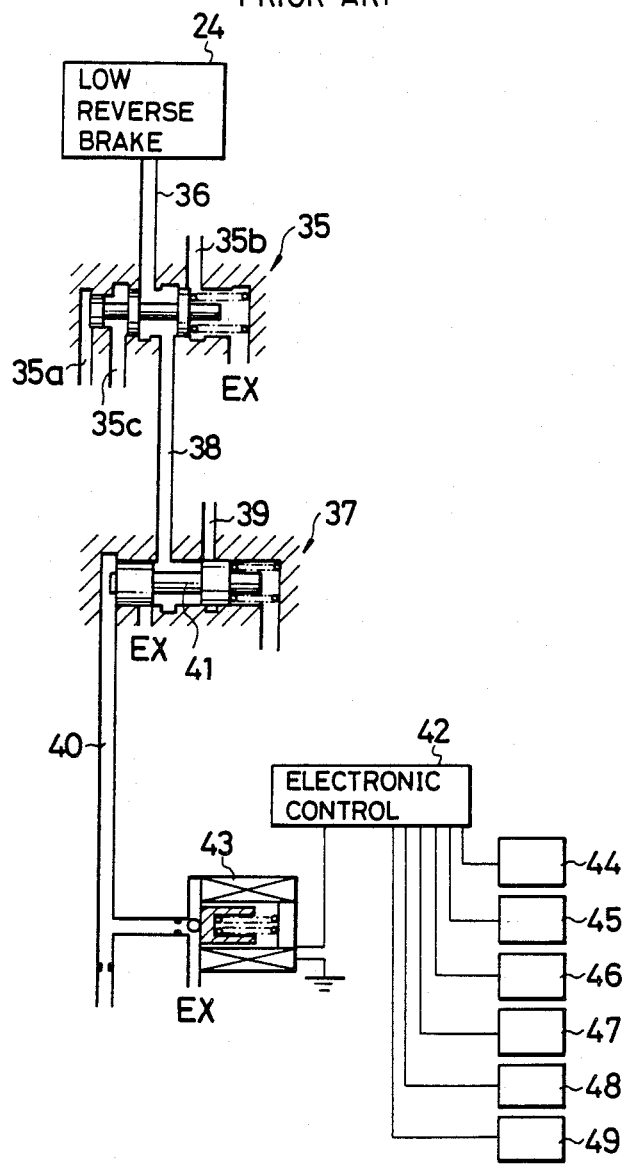
FIG. 2 is a circuit diagram of a prior art hydraulic circuit comprising part of the control sytem controlling the automatic transmission.

Referring now to FIG. 1, a prime mover or an internal combustion engine 11 providing a power source for driving a vehicle is integrally coupled at its output shaft to a pump 14 of a torque converter 13 through an input shaft 12 of the torque converter 13. The torque converter 13 includes the pump 14, a turbine 15, a stator 16 and a one-way clutch 17. The stator 16 is coupled to a casing 18 through the one-way clutch 17. The stator 16 is so arranged that it can rotate in the same direction as the input shaft 12 but is not permitted to rotate in the reverse direction by the function of the one-way clutch 17.

The torque transmitted to the turbine 15 is then transmitted by an output shaft 19 of the torque converter 13 to a speed change gear assembly which is provided behind the torque converter 13 and which obtains four forward speeds and one reverse speed.

The speed change gear assembly includes three clutches 20, 21, 22, two brakes 23, 24 and one ravigneaux type planetary gear set 25. The planetary gear set 25 includes a ring gear 26, a long pinion gear 27, a short pinion gear 28, a front sun gear 29, a rear sun gear 30, and a carrier 31. The carrier 31 rotatably supports the two pinion gears 27 and 28 and is also rotatable around its own axis. The ring gear 26 is coupled to an output shaft 32 of the transmission, and the front sun gear 29 is coupled to the converter output shaft 19 through a kickdown drum 33 and the front clutch 20. The rear sun gear 30 is coupled to the converter output shaft 19 through the rear clutch 21. The carrier 31 is coupled to the casing 18 through the low reverse brake 24 and is also coupled to the converter output shaft 19 through the 4th speed clutch 22 provided at the rear end of the speed change gear assembly. The kickdown drum 33

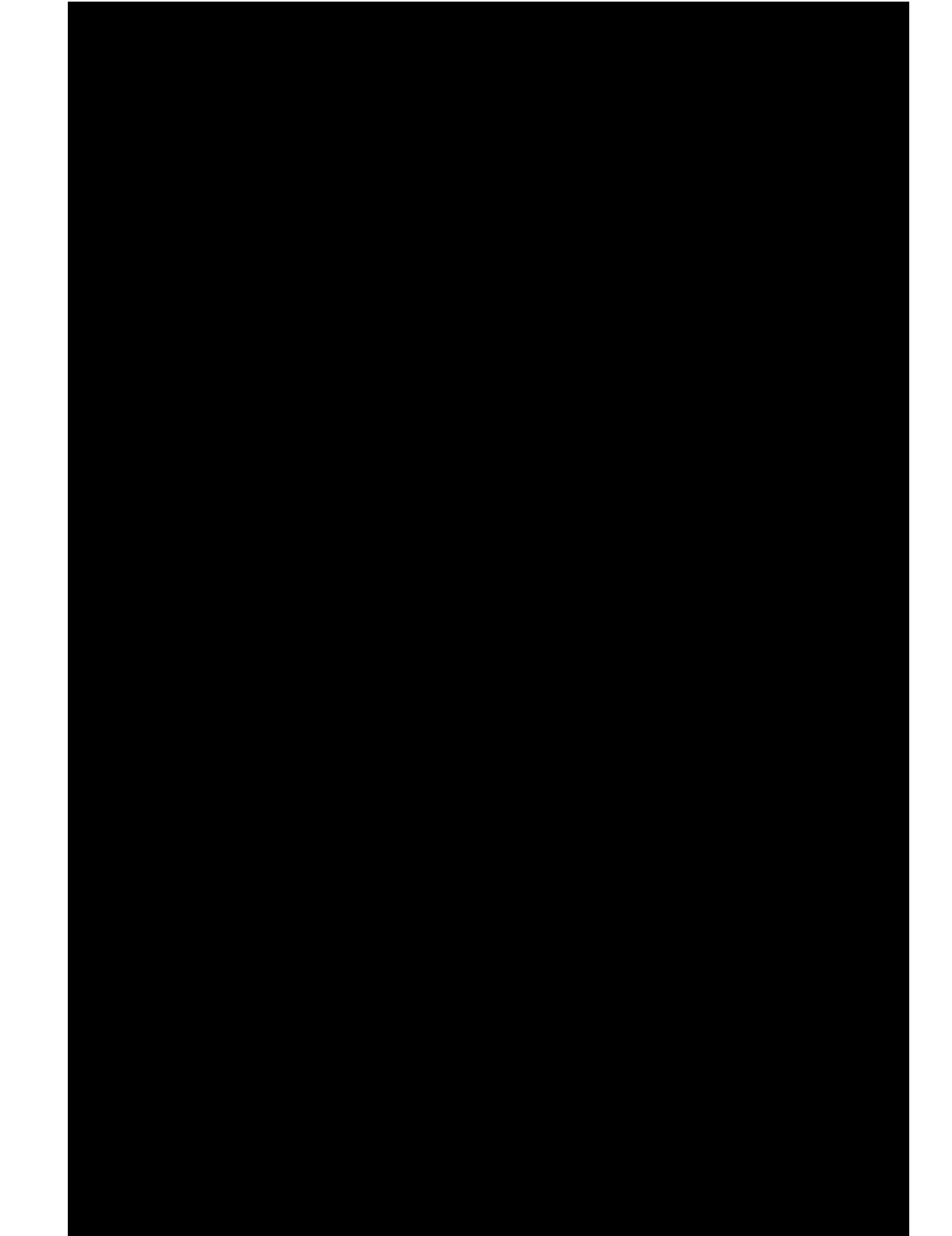

program is executed as in the above case. When, on the other hand, the result of judgment in the step 51 is "YES", judgment is made in the next step 52 as to whether or not the accelerator pedal is depressed, that is, whether or not the driver intends to start the vehicle. The above judgment is based on the output signal of the pedal switch 49.

When the result of judgment in the step 52 is "NO", that is, when the electronic control device 42 judges that the accelerator pedal is not depressed and, hence, the driver does not intend to start the vehicle, the rotation speed $N_e$ of the input shaft 12 of the torque converter 13 is detected in the step 53 on the basis of the output signal of the input-shaft rotation speed sensor 45, and then, the rotation speed $N_t$ of the output shaft 19 of the torque converter 13 is detected in the step 54 on the basis of the output signal of the output-shaft rotation speed sensor 46. In the next step 55, the speed difference $\Delta N = N_e - N_t$ is computed.

In the next step 56, a desired rotation-speed difference $\Delta N'$ (for example, $\Delta N' = 150$ rpm) which is a objective value of the computed rotation-speed difference $\Delta N$ is set, and, in the step 57, the difference $\delta(=\Delta N' - \Delta N)$ between the desired rotation-speed difference $\Delta N'$ and the actual rotation-speed difference $\Delta N$ computed in the step 55 is computed. In the step 58, judgment is made as to whether the difference $\delta$ is positive ($\delta > 0$) or not. When the result of judgment in the step 58 proves that $\delta$ is positive, processing for decreasing the duty ratio of current supplied to the electromagnetic valve 43 to increase the value of hydraulic pressure supplied to the low reverse brake 24 thereby increasing the engaging force, hence, the torque capacity of the low reverse brake 24, is executed in the step 59. When, on the other hand, the result of judgment in the step 58 proves that $\delta$ is negative, processing for increasing the duty ratio of current supplied to the electromagnetic valve 43 thereby decreasing the torque capacity of the low reverse brake 24 is executed in the step 60.

In the step 58, whether $\delta = 0$ or not may also be judged. In such a case, the manner of processing may be such that the current torque capacity of the low reverse brake 24 is maintained when $\delta = 0$.

After execution of the step 59 or 60, the program returns to the step 50 again, and the steps 50 to 59 or 60 are repeated unless the driver's intension to start the vehicle is detected under the circumstance in which the selector lever is positioned in the D or R range in the standstill state of the vehicle. As a result, the torque capacity of the low reverse brake 24 is regulated so that the actual rotation speed difference $\Delta N$ between the input and output shafts 12 and 19 of the torque converter 13 converges to or coincides with the desired rotation-speed difference $\Delta N'$, and the low reverse brake 24 is maintained substantially in a partially engaged state thereby preventing or reducing the undesirable creeping. In the meantime, the line pressure, which is not decreased, is supplied to the rear clutch 21 or front clutch 20 which is to be engaged to achieve the 1st speed ratio or the reverse speed ratio, so that the clutch 21 or 22 is completely engaged.

In a standstill state of the vehicle, the rotation speed difference between the input and output shafts 12 and 19 of the torque converter 13 is preferably as small as possible. This is because all the energy transmitted to the low reverse brake 24 via the torque converter 13 is turned into heat due to the partially engaged (slipping) state of the low reverse brake 24, and, when the rotation speed difference $\Delta N$ is large, greater energy is transmitted to increase the amount of generated heat until finally burnout of the low reverse brake 24 may occur. Especially, burnout of the low reverse brake 24 will occur more easily, and the force causing the creeping will increase, if the rotation speed difference $\Delta N$ is selected to be the same as that desired under the normally idling condition of the engine when the idling rotation speed of the engine is higher than the normal value as when the engine is in its cold state or when the engine operates with an increased load due to, for example, continuous operation of the compressor of the cooler. This is because, the energy transmitted via the torque converter 13 increases in proportion to the second power of the rotation speed of the input shaft 12 of the torque converter 13 with the increase in that rotation speed.

However, if the rotation speed difference $\Delta N$ is set at an excessively small value when the idling rotation speed is low, the torque transmitted via the torque converter 13 is also decreased to such an extent that the torque is now absorbed by the resistances including the resistance of oil against the torque-converter output shaft due to agitation of oil and the dragging resistances of the other frictional engaging devices, resulting in impossibility of maintaining the low reverse brake 24 in its partially engaged state.

Therefore, it is necessary to set the rotation speed difference $\Delta N$ at a relatively large value at a low idling rotation speed of the engine 11 and to set the rotation speed difference $\Delta N$ at a relatively small value at a high idling rotation speed of the engine 11.

To meet the above requirement, the desired rotation-speed difference $\Delta N'$ determined in the step 56 is selected to become smaller with an increase in the rotation speed of the input shaft 12 of the torque converter 13. Thus, the actual rotation-speed difference $\Delta N$ is also controlled to become smaller with the increase in the rotation speed of the input shaft 12 of the torque converter 13. That is, the value of $\Delta N$ is so controlled as to decrease the torque transmitted via the torque converter 13.

The value of the desired rotation-speed difference $\Delta N'$ may be computed on the basis of the output signal of the input-shaft rotation speed sensor 45. Various values of $\Delta N'$ corresponding to various rotation speeds of the input shaft 12 of the torque converter 13 may be stored in a memory to be read out as required. The effect essentially the same as that described above is obtained by a modification in which the value of the desired rotation-speed difference $\Delta N'$ is changed depending on the rotation speed $N_t$ of the output shaft 19 of the torque converter 13 in lieu of the rotation speed $N_e$ of the torque-converter input shaft 12.

When, on the other hand, the result of judgment in the step 52 is "YES", that is, when the result of judgment proves that the accelerator pedal is depressed by the driver who intends to start the vehicle, the rotation speeds $N_e$ and $N_t$ of the input shaft 12 and output shaft 19 of the torque converter 13 are detected in the step 61 on the basis of the output signals from the input-shaft rotation speed sensor 45 and output-shaft rotation speed sensor 46 respectively. In the next step 62, the changing rate $\dot{N}_t$ of the rotation speed $N_t$ of the torque-converter output shaft 19 is computed. Then, in the step 63, a reference changing rate $\dot{N}_t'$, which is a reference of the changing rate $\dot{N}_t$ of the rotation speed is set on the basis of the output signals from the load sensor 44, input-shaft speed ratio. In such a modification, the line pressure not decreased is supplied to the low reverse brake 24, unlike the aforementioned embodiment.

Further, when the automatic transmission is of the type in which a speed ratio other than the 1st or rear speed ratio, for example, the 2nd speed ratio is achieved in the standstill state of the vehicle, the torque transmitting device which is the object of the control may be either the rear clutch 21 or the kickdown brake 23.

The present invention has been described with reference to its embodiment to a power transmission apparatus for a vehicle which includes a torque converter and a speed change gear assembly achieving a plurality of speed ratios by being actuated by a plurality of hydraulically-operated frictional engaging devices. However, the present invention is in no way limited to this embodiment to such a specific power transmission apparatus and is also equally effectively applicable to, for example, a power transmission apparatus for a vehicle which includes a hydrodynamic power transmission, a continuously variable transmission, and a gear assembly incorporated in a power transmission system, disposed in a front stage or a rear stage of the continuously variable transmission, for changing over between forward and rearward speed ratios by being actuated by engageable torque transmitting devices.

Also, the torque transmitting devices may be any suitable ones as far as the torque capacity can be controlled during engagement. Therefore, electromagnetic powder clutches or the like may be employed in place of the hydraulically-operated frictional engaging devices.

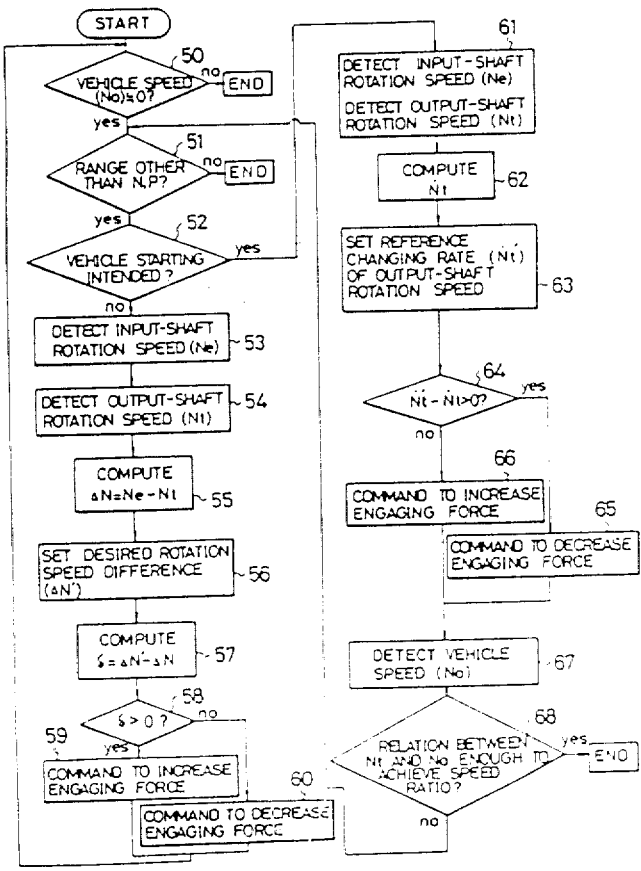

We claim:

1. A control system for controlling a power transmission apparatus for a vehicle, having:
   an engageable torque transmitting device incorporated in a power transmission system between an output shaft of a hydrodynamic power transmission whose input shaft is coupled to a prime mover and a drive shaft of the vehicle for attaining power transmission therebetween;
   a vehicle speed sensing device detecting the traveling speed of the vehicle;
   a first rotation-speed sensing device detecting the rotation speed of the input shaft of said hydrodynamic power transmission or that of said prime mover;
   a second rotation-speed sensing device detecting the rotation speed of the output shaft of said hydrodynamic power transmission;
   a driver's intention sensing device detecting whether or not the driver of the vehicle intends to start the vehicle; and
   an electronic control device for controlling the torque capacity of said torque transmitting device on the basis of the detection output signals applied from said sensing devices, the torque capacity of said torque transmitting device being controlled depending on whether or not the driver intends to start the vehicle from a state of standstill, said electronic control devices is capable of:
   detecting the rotation speed difference between the input shaft and the output shaft of said hydrodynamic power transmission;
   setting a desired rotation speed difference; and
   feedback-controlling the torque capacity of said torque transmitting device so that, when said driver's intention to start the vehicle, the actual rotation speed difference is controlled to converge to said desired rotation speed difference according to the difference between the actual rotation speed difference and said desired rotation speed difference.

2. A control system as claimed in claim 1, wherein said desired rotation-speed difference changes according to the rotation speed detected by said first rotation speed sensing device.

3. A control system as claimed in claim 2, wherein said desired rotation speed difference is decreased with an increase in said detected rotation speed.

4. A control system as claimed in claim 1, wherein said driver's intention sensing device is a sensing device detecting whether or not a control device actuated by the driver for controlling the operating condition of the prime mover is in operation.

5. A control method for controlling a power transmission apparatus for a vehicle, having:
   an engageable torque transmitting device incorporated in a power transmission system between an output shaft of a hydrodynamic power transmission whose input shaft is coupled to a prime mover and a drive shaft of the vehicle for attaining power transmission therebetween;
   a vehicle speed sensing device detecting the traveling speed of the vehicle;
   a first rotation-speed sensing device detecting the rotation speed of the input shaft of said hydrodynamic power transmission or that of said prime mover;
   a second rotation-speed sensing device detecting the rotation speed of the output shaft of said hydrodynamic power transmission;
   a driver's intention sensing device detecting whether or not the driver of the vehicle intends to start the vehicle; and
   an electronic control device capable of controlling the torque capacity of said torque transmitting device on the basis of the detection output signals applied from said sensing devices, the torque capacity of said torque transmitting device being controlled depending on whether or not the driver intends to start the vehicle from a state of standstill, wherein, said torque capacity of said engageable torque transmitting device is controlled by:
   detecting the rotation speed difference between the input shaft and the output shaft of said hydrodynamic power transmission;
   setting a desired rotation speed difference; and
   feedback-controlling the torque capacity of said torque transmitting device so that, when said driver's intention sensing device does not detect the driver's intention to start the vehicle, the actual rotation speed difference is controlled to converge to said desired rotation speed difference according to the difference between the actual rotation speed difference and said desired rotation speed difference.

6. A control method as claimed in claim 5, wherein said desired rotation-speed difference changes according to the rotation speed detected by said first rotation speed sensing device.

7. A control method as claimed in claim 6, wherein said desired rotation speed diffrnece is decreased with an increase in said detected rotation speed.

8. A control method as claimed in claim 5, wherein said driver's intention sensing device is a sensing device

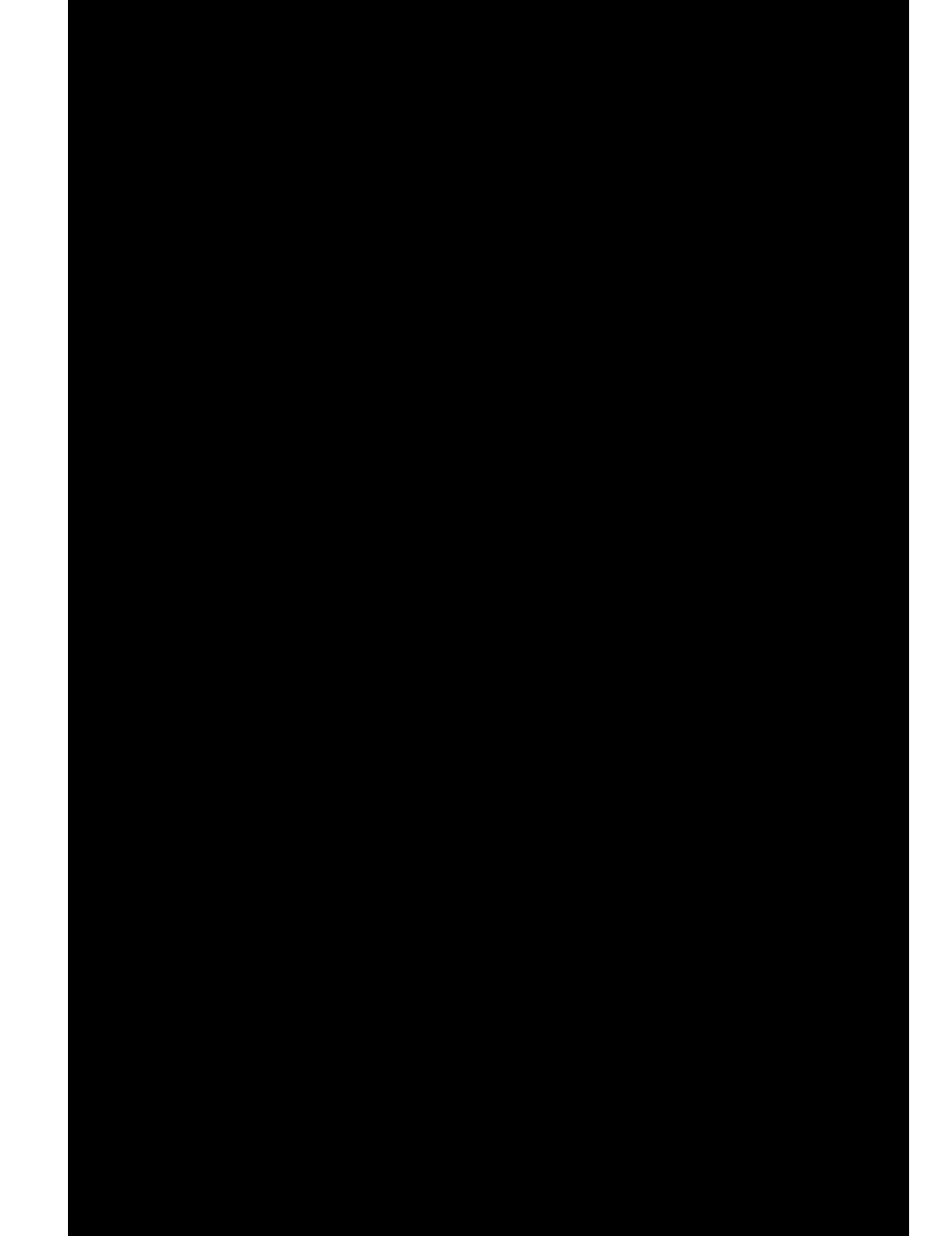

ing to the rotation speed detected y said rotation speed sensing device.

17. A control method as claimed in claim 16, wherein said desired rotation speed difference is decreased with an increase in said detected rotation speed.

18. A control method as claimed in claim 16, wherein said driver's intention sensing device is a sensing device detecting whether or not an accelerator pedal for controlling the operating condition of the engine is depressed by the driver.

19. A control method for controlling a power transmission apparatus for a vehicle, having:
   a gear assembly incorporated in a power transmission system between an output shaft of a hydrodynamic power transmission whose input shaft is coupled to an internal combustion engine and a drive shaft of the vehicle so as to obtain at least a forward, a rearward and a neutral power transmission mode;
   a frictional engaging device obtaining the forward or rearward power transmission mode of said gear assembly when engaged;
   a position sensing device detecting the position of a manual shifting device capable of changing over the power transmission mode of said gear assembly;
   a vehicle speed sensing device detecting the traveling speed of the vehicle;
   a driver's intention sensing device detecting whether or not the driver of the vehicle intends to start the vehicle;
   a first rotation-speed sensing device detecting the rotation speed of the input shaft of said hydrodynamic power transmission;
   a second rotation-speed sensing device detecting the rotation speed of the output shaft of said hydrodynamic power transmission; and
   an electronic control device capable of controlling the torque capacity of said frictional engaging device onthe basis of the detection output signals applied from said sensing devices, the torque capacity of said frictional engaging device being controlled depending on whether or not the driver intends to start the vehicle when the vehicle is in a state of standstill and said position sensing device detects that said shifting device is in the position corresponding to the forward or rearward power transmission mode,
   wherein said torque capacity of said engageable torque transmitting device is controlled by:
   computing the rotation speed difference between the input shaft and the output shaft of said hydrodynamic power transmission on the basis of the detection output signals applied from said first and second rotation speed sensing device;
   setting a desired rotation speed difference;
   feedback-controlling the torque capacity of said frictional engaging device so that, when said driver's intention sensing device does not detect the driver's intention to start the vehicle, the actual rotation speed difference is controlled to converge to said desired rotation speed difference according to the difference between said actual rotation speed difference and said desired rotation speed difference;
   computing the rate of change of the rotation speed of the output shaft of said hydrodynamic power transmission on the basis of the detection output signal applied from said second rotation speed sensing device;
   setting a reference changing rate; and
   feedback-controlling the torque capacity of said frictional engaging device so that, when said driver's intention sensing device detects the driver's intention to start the vehicle, the actual changing rate is controlled to converge to said reference changing rate according to the difference between said actual changing rate and said reference changing rate until said frictional engaging device is completely engaged.

20. A control method as claimed in claim 19, wherein said desired rotation-speed difference changes according to the rotation speed of the input shaft detected by said first rotation-speed sensing device.

21. A control method as claimed in claim 20, wherein said desired rotation speed difference is decreased with an increase in said detected rotation speed.

22. A control method as claimed in claim 19, wherein said desired rotation-speed difference changes according to the rotation speed of the output shaft detected by said second rotation-speed sensing device.

23. A control method as claimed in claim 19, wherein said reference changing rate is set according at least to the rotation speeds of the input and output shafts of said hydrodynamic power transmission.

24. A control method as claimed in claim 19, wherein said driver's intention sensing device is a sensing device detecting whether or not an accelerator pedal for controlling the operating conditon of said engine is depressed by the driver.

* * * * *

UNITED STATES PATENT AND TRADEMARK OFFICE
CERTIFICATE OF CORRECTION

PATENT NO. : 4 775 938

DATED : October 4, 1988

INVENTOR(S) : HIRAMATSU

Figure 5A:
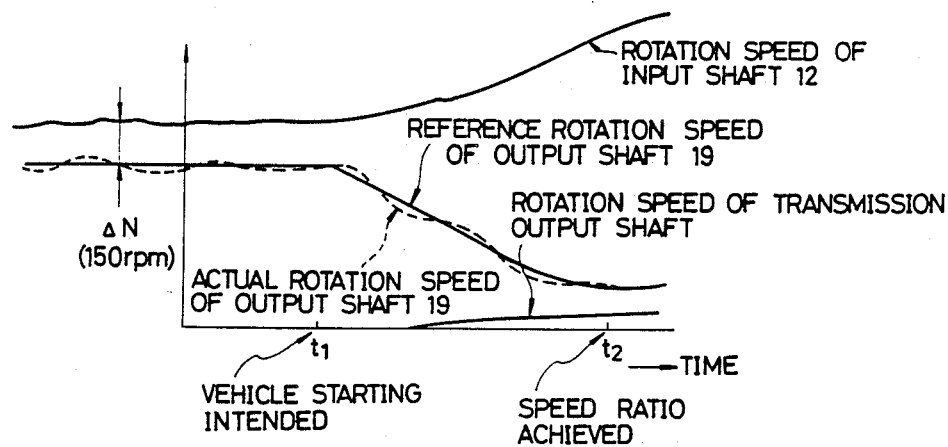
Figure 5B:
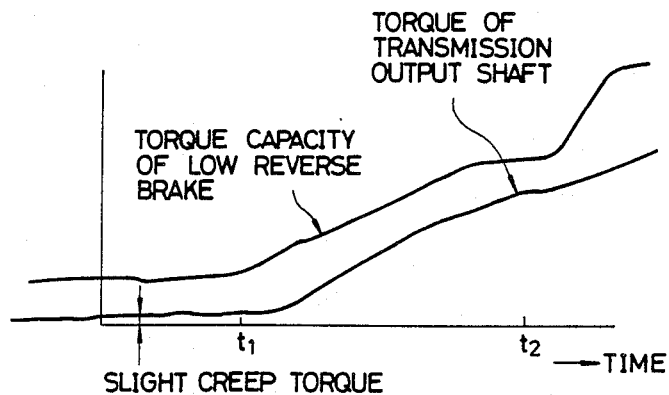

It is certified that error appears in the above-identified patent and that said Letters Patent is hereby corrected as shown below:

Cancel Figure 3: Renumber Figure 4 as Figure 3:
Renumber Figure 5(a) as FIgure 4(a): Renumber
Figure 5(b) as Figure 4(b).

The title page should be deleted to appear as per attached title page.

Signed and Sealed this

Sixth Day of June, 1989

Attest:

DONALD J. QUIGG

Attesting Officer

Commissioner of Patents and Trademarks

United States Patent [19]

Hiramatsu

[11] Patent Number: 4,775,938
[45] Date of Patent: Oct. 4, 1988

[54] SYSTEM AND METHOD FOR CONTROLLING A POWER TRANSMISSION OF A VEHICLE

[75] Inventor: Takeo Hiramatsu, Nagaokakyo, Japan

[73] Assignee: Mitsubishi Jidosha Kogyo Kabushiki Kaisha, Tokyo, Japan

[21] Appl. No.: 791,898

[22] Filed: Oct. 28, 1985

[30] Foreign Application Priority Data

Oct. 31, 1984 [JP] Japan ............. 59-227950
Oct. 31, 1984 [JP] Japan ............. 59-229490

[51] Int. Cl.⁴ ............. B60K 41/08; F16H 47/00
[52] U.S. Cl. ............. 364/424.1; 74/866; 74/867
[58] Field of Search ............. 364/424.1; 74/865, 866, 74/867, 869

[56] References Cited

U.S. PATENT DOCUMENTS

| | | | |
|---|---|---|---|
| 4,513,639 | 4/1985 | Hiramatsu | 74/866 |
| 4,538,482 | 9/1985 | Hiramatsu | 74/869 |
| 4,603,604 | 8/1986 | Nishikawa et al. | 74/869 |
| 4,633,985 | 1/1987 | Leorat | 74/866 |
| 4,653,622 | 3/1987 | Miyake | 74/866 |
| 4,660,442 | 4/1987 | Nishikawa et al. | 74/869 |

Primary Examiner—Felix D. Gruber
Attorney, Agent, or Firm—Abelman, Frayne Rezac & Schwab

[57] ABSTRACT

The torque capacity of a torque transmitting device incorporated in a power transmission system between an output shaft of a hydrodynamic power transmission and a drive shaft of a vehicle is so controlled as to provide a predetermined rotation speed difference between the input and output shafts of the hydrodynamic power transmission when the vehicle is in a state of standstill, thereby reducing creeping of the vehicle in the standstill state and also improving the response of the power transmission system at the time of vehicle starting. When the vehicle is to be started, the torque capacity is feedback-controlled so as to change the rotation speed of the output shaft of the hydrodynamic power transmission at a predetermined changing rate, thereby ensuring smooth starting without any appreciable shock.

24 Claims, 5 Drawing Sheets